Aug. 26, 1930.  C. W. VAN RANST  1,774,071
AUTOMOBILE CONSTRUCTION
Filed March 9, 1929
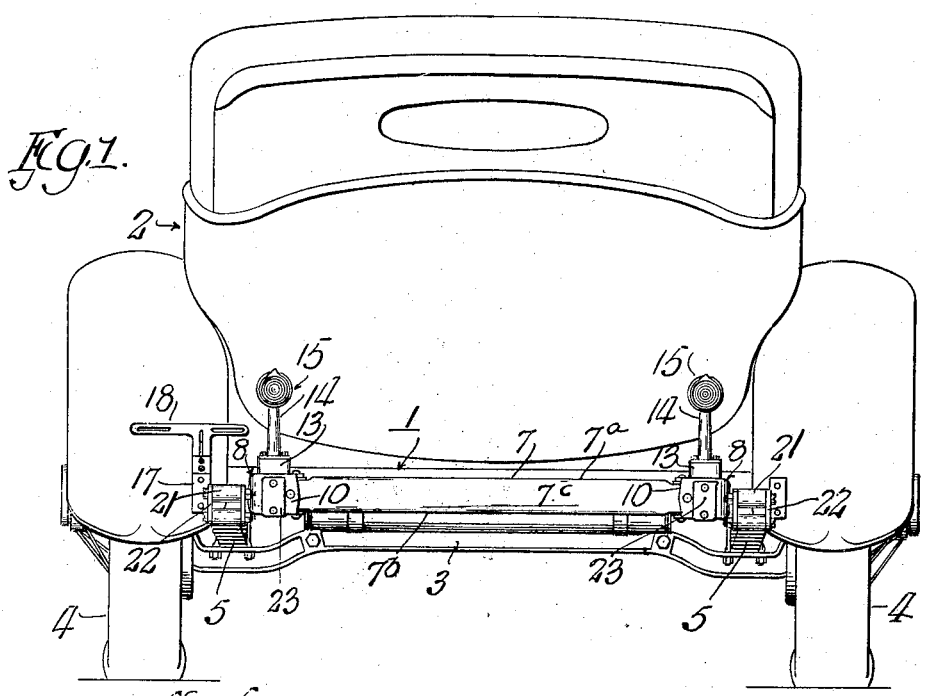
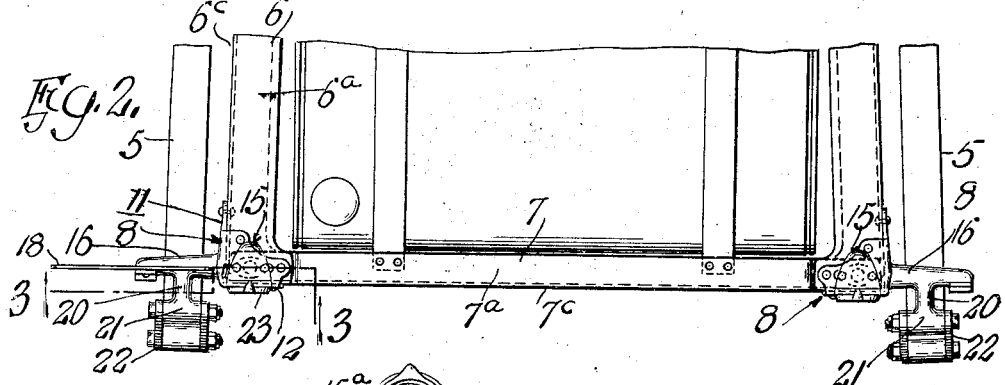
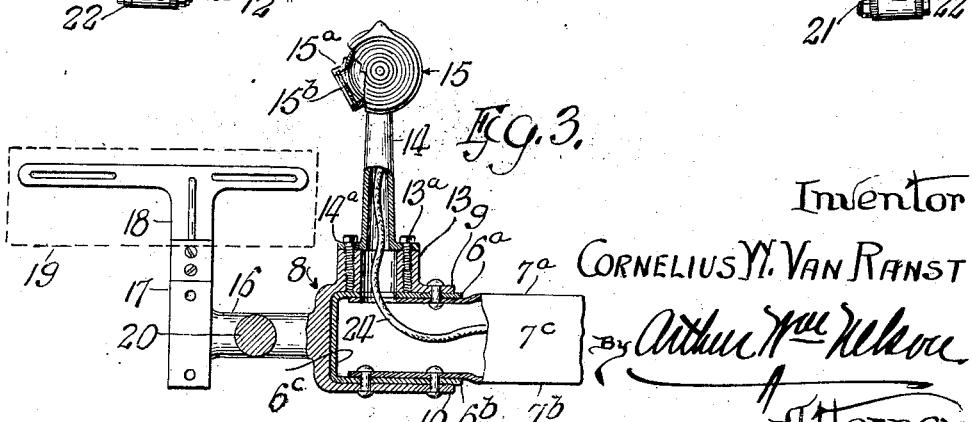
Inventor
CORNELIUS W. VAN RANST
By Arthur W. Nelson
Attorney Patented Aug. 26, 1930

1,774,071

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

AUTOMOBILE CONSTRUCTION

Application filed March 9, 1929. Serial No. 345,795.

This invention relates to improvements in automobile constructions and it consists of the matters hereinafter described and more particularly pointed out in the appended claims.

The primary object of the invention is to provide a simplified and improved construction for the rear end of the frame which embodies a novel corner bracket capable of forming the support for the tail and stop lights and license plates as well as a member by which each rear corner of the frame may be operatively connected to the associated spring.

Another object of the invention is to provide a construction whereby the wiring for the stop and tail lights may be more readily carried out and concealed.

Still another object of the invention is to provide a rear corner construction for the frame which will reduce the number of parts now necessary to accomplish the same functions in automobiles as now made and which will provide a more trim and neat appearance to the rear end of the automobile.

These objects of the invention as well as others, together with the many advantages will more fully appear as I proceed with my specification.

In the drawings:—

Fig. 1 is a view in rear elevation of an automobile embodying my improved construction.

Fig. 2 is a top plan view on an enlarged scale of the rear end of the frame of the automobile, embodying my invention, with the body removed to more clearly disclose the improved construction.

Fig. 3 is a vertical detail sectional view on a further enlarged scale as taken on the line 3—3 of Fig. 2.

Referring now in detail to that embodiment of the invention illustrated in the accompanying drawing, 1 indicates as a whole the rear end part of an automobile frame, 2 indicates the body thereon, 3 the rear axle having associated wheels 4, and 5 indicates the usual leaf springs supporting said frame part from the axle.

The frame comprises substantially parallel side members 6—6 and a rear cross member 7, all made of a channel cross section with the flanges directed inwardly. Each side member comprises horizontally disposed top and bottom flanges $6^a$—$6^b$ and a vertically disposed web $6^c$ respectively and the rear cross member comprises top and bottom horizontally disposed flanges $7^a$—$7^b$ and a vertical web $7^c$ respectively. The end portions of the cross member are swedged down to fit within the top and bottom flanges of the side frame members as best shown in Fig. 3.

As the constructions of the rear corners of the frame are alike with the exception of being "right" and "left" a detailed construction will suffice for both.

8 indicates as a whole a corner bracket which includes substantially parallel top and bottom walls 9 and 10 respectively, and side and rear walls 11 and 12 respectively, disposed at a right angle to each other and to said top and bottom walls. The said top and bottom walls engage upon portions of the like flanges of the side frame members 6 and to which they are suitably secured as by riveting as shown and the side wall and rear wall engage with portions of the upright webs $6^c$ and $7^c$ and are also suitably secured thereto as by riveting. By this arrangement the side and rear members of the frame are securely connected together in a manner providing a strong rigid construction.

On the top wall of the bracket 8 is formed an upstanding tubular boss 13 upon which is mounted an upright tubular standard 14 carrying a lamp casing 15 at its top end. The lamp casing shown at the left hand side of the automobile constitutes the tail light and the lamp casing at the right hand side thereof constitutes the stop light.

Extending laterally from the side wall 11 of the corner bracket is an arm 16 that terminates in an upturned end 17 to which is secured a substantially T shaped bracket 18 adapted to have secured to it in any suitable manner, a license plate 19 indicated in dotted lines in Fig. 3. Integral with the laterally extending arm 16 is a rearward extending hanger 20 terminating in a transversely extending tubular boss 21 with which shackle links 22 are operatively engaged to connect each corner bracket to an associated spring 5.

On the rear wall of each bracket, in line with the associated standard 14 is provided a faced off boss 23 whereby a suitable bumper construction (not shown) may be attached to the automobile frame.

Preferably the standard 14 before mentioned is detachably connected to the boss 13 and the bottom end of the standard is therefor provided with a flange 14ª to seat upon the boss 13, bolts 13ª extending through said flange into said boss as best shown in Fig. 3. In said Fig. 3 I have shown suitable wiring 24 for the lamp casing 15 which leads to a suitable source of current supply, which wiring is entirely concealed and protected by the frame members in which it is convenient to run the same.

In the case of the tail light casing 15, the same is provided with a lateral and downward extension 15ª including a lens 15ᵇ by which the license plate 19 is illuminated during the "on" periods of the tail light.

The construction described provides a simple and rigid construction capable of performing several functions, namely to connect the frame members together, support the usual tail light, stop light and license plate and to provide efficient means to which the spring shackle links are connected and to which the usual bumper may be secured when so desired.

While in describing my invention, I have referred in detail to the form, arrangement and construction of the various parts thereof, the same is to be considered merely as illustrative so that I do not wish to be limited thereto except as may be specifically pointed out in the appended claims.

I claim as my invention:—

1. An automobile embodying therein, a frame including side and end members and a bracket connecting said members together at each rear corner of the frame and a tubular lamp casing standard fixed to and rising from said bracket said bracket having an opening therein for the passage of current conductors from one of said members up through said tubular standard.

2. An automobile frame bracket comprising top and bottom walls and a side and end wall connected thereto, the top wall having an annular boss thereon and one of the other walls having a laterally extending arm including a rearwardly extending portion formed at its free end for operative connection with one end of an automobile spring.

3. In an automobile, in combination with the meeting ends of a side and a rear cross member of the frame thereof each of which members are of a channel shaped cross section, a corner bracket having parts engaged with and secured to the top and bottom portions as well as to the outer wall portions of said member, said corner bracket including a laterally extending arm disposed in the plane of said rear cross member, which arm is adapted for connection with one end of a spring associated with said frame.

4. In an automobile, in combination with the meeting ends of a side and rear cross member of the frame thereof, each of which members are of channel shaped cross section with one member swedged down to fit within the other, a corner bracket enclosing and secured to the meeting ends of said members and having a lamp standard boss on one portion thereof, a tubular lamp standard fixed on said boss, a current conductor concealed in said standard and extending through said boss into one of said members and means for operatively securing one end of an automobile spring to said corner bracket.

In testimony whereof I have hereunto set my hand this 6th day of March, 1929.

CORNELIUS W. VAN RANST.